United States Patent [19]

Berenbaum et al.

[11] Patent Number: 5,778,435
[45] Date of Patent: Jul. 7, 1998

[54] HISTORY-BASED PREFETCH CACHE INCLUDING A TIME QUEUE

[75] Inventors: Alan David Berenbaum, New York, N.Y.; Tor E. Jeremiassen, Somerset, N.J.

[73] Assignee: Lucent Technologies, Inc., Murray Hill, N.J.

[21] Appl. No.: 655,590

[22] Filed: May 30, 1996

[51] Int. Cl.$^6$ .............................. G06F 12/08; G06F 9/00
[52] U.S. Cl. ...................... 711/137; 395/343; 395/585
[58] Field of Search ...................................... 395/464, 381, 395/382, 383, 584, 585, 586, 587

[56] References Cited

U.S. PATENT DOCUMENTS

| | | | |
|---|---|---|---|
| 5,553,254 | 9/1996 | Berstis et al. | 711/137 |
| 5,561,782 | 10/1996 | O'Connor | 711/137 |
| 5,586,294 | 12/1996 | Goodwin et al. | 711/137 |

OTHER PUBLICATIONS

Park et al., "Non-referenced prefetch(NRP) cachefor instruction prefetching", IEE Proceedings–Computers and Digital Techniques, V 143, Iss 1, P 37–43, Jan. 1996.

Billingsley et al., "Memory Latency Reduction Using An Address Prediction Buffer", Conference record of the twenty-sixth Asilomar Conference on Signals, systems and Computers vol. 1 p. 78–82, Oct. 1992.

Zero–Cycle Loads: Microarchitecture Support for Reducing Load Latency, Austin et al., Proceedings of the 28th Annual International Symposium on Microarchitecture; Dec. 1995.

Streamlining Data Cache Acess with Fast Address Calculation, Austin et al., Jun. 1995, Proceedings of the 22nd Annual International Symposium on Computer Architecture.

An Effective On–Chip Preloading Scheme to Reduce Data Access Penalty, Baer et al., SUPERCOMPUTING '91, pp. 176–186, Nov. 1991.

Compiler Techniques for Data Prefetching on the PowerPC, Bernstein et al., Proceedings of the Conference on Parallel Architectures and Compiler Techniques, pp. 19–26, Jul. 1995.

Reducing Memory Latency via Non–blocking and Prefetching Caches, Chen et al., University of Washington, Jun. 1992.

Data Prefetcching for High–Performance Processors, Tien–fu Chen, PhD thesis, University of Washington, Jul. 1993.

A Load–Instruction Unit for Pipelined Processors, Eickemeyer et al., IBM Journal of Research and Development, Jul. 4, 1993.

Hardware Support for Hiding Cache Latency, Golden et al., University of Michigan Technical Report, Jan. 13, 1995.

Branch History Table Prediction of Moving Target Branches Due to Subroutine Returns, Kaeli et al., Proceedings of the 18th Annual International Symposium on Computer Architecture, pp. 34–42, Canada, May 1991.

An Architecture for Software–Controlled Data Prefetching, Klaiber et al., Proceedings of the 18th Annual International Symposium on Computer Architecture, pp. 45–53, Canada, May 1991.

(List continued on next page.)

*Primary Examiner*—Eddie P. Chan
*Assistant Examiner*—Reginald G. Bragdon
*Attorney, Agent, or Firm*—Morgan & Finnegan, LLP

[57] ABSTRACT

A history-based prefetch cache which includes a time queue. The time queue correlates past events with cache misses in a microprocessor. The time queue is set to N cycles, N being a predetermined, arbitrary or programmable amount. The prefetch cache is a prefetch target buffer which receives inputs from a time queue and a cache and determines if an event is present in the cache. If an address is not present in the cache it is prefetched based on past events and inserted into the prefetch target buffer so that the microprocessor will not miss it the next time.

21 Claims, 2 Drawing Sheets

U.S. PATENT DOCUMENTS

Branch Prediction Strategies and Branch Target Buffer Design, Lee et al., IEEE COMPUTER, pp. 6–22, Jan. 1984.

The 801 Minicomputer, George Radin, First Symposium on Architectual Support for Programming Languages and Operating Systems, pp. 39–47, Mar. 1982.

A Study of Branch Prediction Strategies, James E. Smith, 8th Annual International Symposium on Computer Architecture, pp. 135–148, May 1981.

Sequential Program Prefetching in Memory Hierarchies, Alan Jay Smith, IEEE COMPUTER, pp. 7–21, Dec. 1978.

Cache memories, Alan Jay Smith, ACM Computing Surveys, vol. 14, No. 3, pp. 473–530, Sep. 1982.

Prefetch Unit for Vector Operations on Scalar Computers, Ivan Sklenar, Computer Architecture News, vol. 20, No. 4, pp. 31–47, May 27, 1992.

Limitations of Cache Prefetching on a Bus–Based Multiprocessor, Tullsen et al., Proceedings of the 20th Annual International Symposium on Computer Architecture, pp. 278–288, May 1993.

Effective Cache Prefetching on Bus–Based Multiprocessors, Tullsen et al., ACM Transactions on Computer Systems, vol. 13, No. 1, pp. 57–88, Feb. 1995.

Pollution Control Caching, Walsh et al., Proceedings of the International Conference on Computer Design, pp. 300–306, Oct. 1995.

A Comparison of Dynamic Branch Predictors that use Two Levels of Branch History, Yeh et al., Proceedings of the 20th Annual International Symposium Computer Architecture, pp. 257–267, May 1993.

Improving Direct Mapped Cache Performance by the Addition of a Small Fully Associative Cache and Prefetch Buffers, Norman P. Jouppu, Proceedings of the 17th Annual Symposium on Computer Architecture, pp. 364–373, Seattle, Washington, May 1990.

100: load r3, Y
101: add r1, r2
102: sub r3, r5
103: load r4, X
*FIG. 3A*
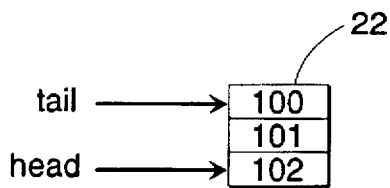
*FIG. 3B*
100: load r3, Y
101: add r1, r2
102: sub r3, r5
103: load r4, X
 .
 .
 .
200: add r3, r1
201: branch 102
*FIG. 4A*
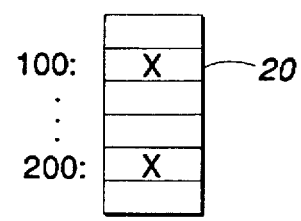
*FIG. 4B*

HISTORY-BASED PREFETCH CACHE INCLUDING A TIME QUEUE

DESCRIPTION OF THE INVENTION

The present invention is directed to a history-based prefetch cache, and more particularly to a history-based prefetch cache including a time-queue which correlates past events with cache misses in a microprocessor.

DESCRIPTION OF THE PRIOR ART

Caches are small high speed buffer memories normally placed between a processor and a memory store to increase processor speed. They bridge the gap between faster processor speed and slower memory speed. However, this speed gap continues to grow and delays are caused by cache misses. A cache miss occurs when the cache itself must fetch data from a slower main memory. Maintaining a low cache miss rate is crucial to obtaining good performance. Caches are now located directly on the processor chip or closely adjacent thereto. This has helped to reduce the access time and miss rate. The size and associativity of the cache is limited by the bit-line length that can be driven or the number of multiplexers that can be inserted on the very short cycle time of the cache.

Prefetching has been developed to improve performance of the cache by reducing cache miss rates without changing the basic cache architecture. This is done by fetching data into the cache before the data is referenced. Prefetching techniques are software controlled, hardware controlled or both hardware and software controlled.

In software controlled prefetching, special instructions are inserted by a compiler to provide a memory subsystem with hints to the addresses of anticipated loads and stores. Since the instructions are actually executed they consume instruction fetch and issue bandwidths. The effectiveness of software controlled prefetching is limited by the ability of the compiler to accurately predict future data references, i.e., generate prefetch instructions that bring a new block into the cache that is subsequently referenced, without lengthening the critical path of the program. Software controlled caches and microprocessors with cache prefetch instructions have been developed to improve cache latency. Software controlled prefetching, however, offers only a small benefit for programs with irregular memory access patterns. Further, the prefetch instructions can increase code size which reduces hit rates in an instruction cache, can increase pressure on registers to calculate the effective addresses and can occupy pipeline slots as they execute.

Hardware controlled prefetching can be divided into two classes according to how the prefetches are generated; spatial prefetching schemes and temporal prefetching schemes. Spatial prefetching is based on the likelihood that once data is referenced nearby data is also likely to be referenced. In spatial prefetching schemes the decision to prefetch is determined by the current cache access, e.g., fetching the cache block adjacent to the cache block currently being accessed. However, spatial prefetching schemes suffer from not being able to adapt to the application's memory reference pattern and the timing of the prefetch is not linked to the time of the actual use of the prefetched data.

When using a sequential prefetching scheme, which is a type of spatial prefetching scheme, the prefetching will fail at branches. Branch target buffers have been developed to reduce cache hit cost by delivering data before a cache could do so. This is discussed in "Branch Prediction Strategies and Branch Target Buffer Designs," Lee et. al., *IEEE Computer*, vol. 17(1), pp. 6–22, Jan. 1984. Following the wrong branch can cause performance delays. Branch prediction strategies have been developed to eliminate latency by prediction as discussed in "A Study of Branch Prediction Strategies," J. E. Smith, *Eighth Annual International Symposium on Computer Architecture*, pp. 135–148, Minneapolis, Minn., May, 1981. Branch history tables were developed for branch behavior as described in "Branch History Table Prediction of Moving Target Branches due to Subroutine Returns," Kaeli et.al., *Eighteenth Annual International Symposium on Computer Architecture*, pp. 34–42, Toronto, Canada, May, 1991.

In temporal prefetching schemes prefetches are issued by examining the instructions ahead in the instruction stream, including speculating past branches, and predicting the addresses that will be used by future load instructions and store instructions. However, temporal prefetching schemes suffer from not being able to look far enough ahead in the instruction stream to issue prefetches in time when memory latency is large.

Methods for handling latency in data accesses and instruction accesses include extending a cache block size to effectively prefetch a block full of data with each cache block fetched from memory in response to a cache miss. This is effective if nearby data is likely to be used in the near future. Load target buffers, analogous to branch target buffers, for instruction fetches have also been proposed as explained in, for example, Golden et al., "Hardware Support for Hiding Cache Latency," Technical Report, University of Michigan, Jan. 1995. In addition, several studies, including "Prefetch Unit for Vector Operations on Scalar Computers," Ivan Sklenar, *Computer Architecture News*, Vol. 20(4), pp 31–37, September, 1992, have explored prefetching data when using processing vectors.

An alternative to fetching the correct data early with a target buffer is to predict the correct address to predict. A look-ahead program counter has been used to predict future data references as disclosed in "Data Prefetch for High-Performance Processors," Tien-Fu Chen, PhD thesis, University of Washington, July 1993. Additionally a method for fast address calculation attempts to present a load address to the cache before the load is fully decoded is described in "Streamlining Data Cache Access with Fast Address Calculation," Austin, et. al., *Twenty-Second Annual International Symposium on Computer Architecture*, pp. 369–380, Santa Margherita Ligure, Italy, June 1995.

All the above methods have draw-backs in that they must act faster than the processor because they must look-ahead and they require time to perform the look-ahead. Further, these methods can only be used with caches that are on the processor or are directly adjacent the processor.

SUMMARY OF THE INVENTION

The present invention provides a history-based prefetching scheme that can be used with hardware or software. A history-based prefetch cache associates events with addresses missed in a cache so that when an event is seen again a prefetch can be issued and a processor will not miss it. A time queue is provided to adjust memory latency to satisfy cache misses.

The prefetch system and technique of the present invention is applicable to different levels of memory hierarchy. It can be used to prefetch data and instructions and can be used in hardware and software schemes. The prefetched system and technique can be used in any cache anywhere in a system.

A method according to the present invention includes determining a cache miss, inserting an address correlated to the cache miss into a buffer, indexing the buffer by an address of an instruction that was issued N cycles previously, (N being a predetermined, arbitrary or programmable amount), using the address of the instruction to perform a look up operation in the buffer, determining if the address of the instruction was found in the buffer, determining if the address of the instruction is in the cache, and performing a cache prefetch operation if the address is not in the cache. The buffer can be a prefetch target buffer. The addresses in the buffer includes data or instructions space.

Additionally, a history-based prefetch system is also provided. A time queue is provided to receive events and output delayed events. The prefetch target buffer receives the events directly and receives the delayed events from the time queue. An event includes any tag that is part of a sequence and may reoccur. The directly received events are used to perform lookups in the prefetch target buffer. If there is a hit in the prefetch target buffer and an address associated with the event is not in the cache prefetched into, then a cache prefetch is performed into the cache. The missing address is inserted into the prefetch target buffer which is indexed by an event that occurred N cycles previously.

Other objects, advantages, and salient features of the invention will become apparent from the following detailed description which, when taken in conjunction with the annexed drawings, discloses preferred but non-limiting embodiments.

BRIEF DESCRIPTION OF THE DRAWINGS

FIGS. 3A and 3B are a diagram showing an instruction sequence and addresses in a time queue, respectively, for explaining the operation of a time queue; and FIGS. 4A and 4B show code fragments with load alias in a prefetch target buffer.

DESCRIPTION OF THE PREFERRED EMBODIMENTS

The present invention is directed to a history-based prefetch. The goal of prefetching is to get data from an external memory into a cache rather than presenting the data directly into a data path of a processor. The goal of history-based prefetching is to move data from a main memory into a cache in anticipation of its use. History-based prefetching predicts the address of data for a future data fetch rather than predicting the value of that data for a future data fetch. A data (instruction) cache can be an associative memory linking data addresses to data. That is, the address of the data is used to fill a cache block with the predicted data. An address prediction cache can be an associative memory linking events with addresses of potential future memory accesses. The address prediction cache can be a prefetch target buffer. The associative memory is indexed by an address provided by a processor data path and returns the address of a cache block that is likely to be used in the near future. If this cache block is already present in the cache, nothing further occurs. If this cache block is not present in the cache a prefetch is begun to place the block in the cache.

Figure 1:
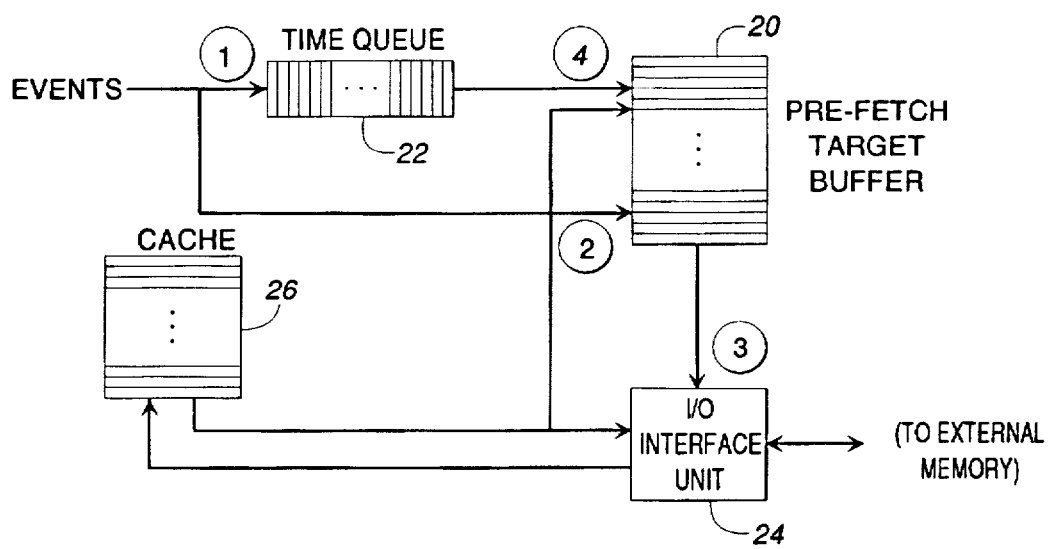
FIG. 1 is a block diagram of a system according to the present invention which uses a prefetch target buffer and a time queue.

A system using a prefetch target buffer 20 is shown in FIG. 1. For simplicity only a few functional units are shown. The prefetch target buffer 20 can be configured for either instructions or data. The addresses stored in the prefetch target buffer 20 can be either instruction addresses or data addresses. Instruction addresses trigger prefetches to an instruction cache and data addresses trigger prefetches to a data cache. Other arrangements may be had with the same result.

A time queue 22 and the prefetch target buffer 20 both receive events. The time queue 22 delays the received events and inputs a delayed event to the prefetch target buffer 20. The events are delayed by N cycles, N being a predetermined amount, a programmable amount or any amount. An input/output (I/O) interface unit 24 receives the output from the prefetch target buffer 20 and the external memory (not shown). The I/O interface unit 24 inputs the received data from the prefetch target buffer 20 and the external memory into a cache 26. The cache 26, then outputs the address of a hit to the prefetch target buffer 20 and I/O interface unit 24.

The I/O accesses generated by the prefetch target buffer 20 are called prefetches rather than fetches. Fetches are performed, for example, by a branch target buffer which uses a small high-speed prediction memory to provide data to a processor on an alternate data path. If a prediction is incorrect, the fetched data is ignored and the normal processormemory access paths are used. Prefetches do not modify the normal processor-memory data paths. Rather, prefetching employs past memory usage to predict memory access patterns, e.g., it is a prediction mechanism that guesses what data will be referenced by the processor. The data is brought into the cache 26 hopefully before it is requested by the program.

Any prefetch mechanism requires two components: address prediction and issue management. Address prediction is guessing the address of a datum that will be referenced by the processor. Issue management insures that the prefetch takes place before the data is needed. As an example, a system that uses explicit prefetch instructions delegates address prediction and issue management to a compiler. The compiler guesses an address and tries to insert a prefetch instruction sufficiently far ahead of the associated load (for data prefetches) or branch (for program prefetches) so that the prefetch can be completed before the load (branch) is executed. Automatic methods must use heuristics based on program behavior.

To maximize the effectiveness of prefetching, it is necessary to predict the effective address of a load at least N cycles before it executes. N is described above and is the cache miss latency. This is accomplished by associating the prefetch with an event such as the completion of an instruction that took place N cycles earlier. An event is an address, etc., that can be repeatable and predictive with respect to what will be addressed in the cache that is prefetched into. Events provide information as to where in the program the processor is currently executing. Events can be, for example, instruction addresses, addresses of a subset of instructions, effective addresses of load instructions or data addresses.

Figure 2:
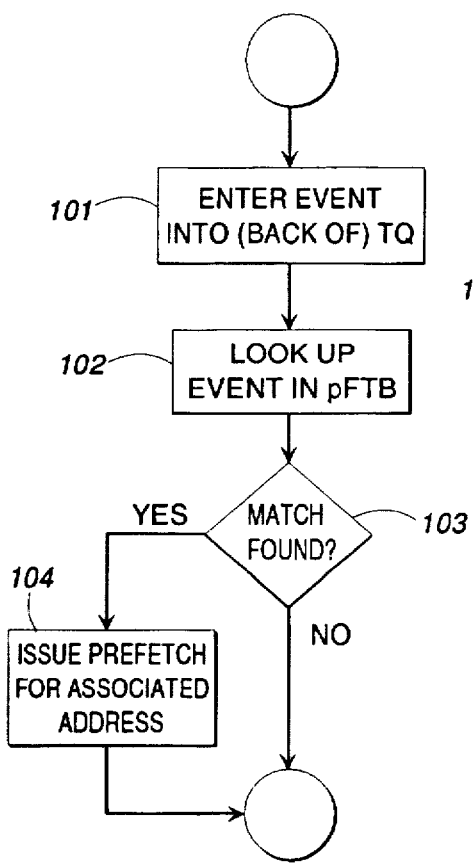
FIG. 2 is a flow chart showing the operation of the present invention.
Figure 2:
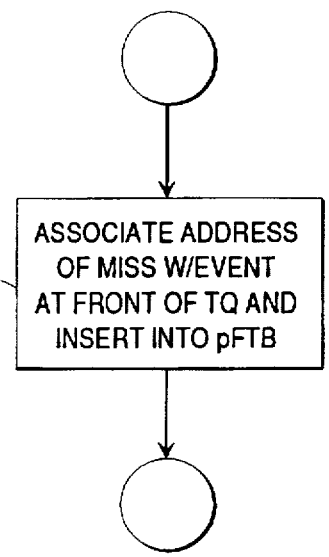

The operation of a cache 26 using a prefetch target buffer 20 and time queue 22 of the present invention is explained with reference to the flow chart in FIG. 2. Two procedures are performed concurrently and in parallel. For every new event, as shown in FIG. 2, at step 101 (corresponding to ① in FIG. 1), an event is entered into the back of the time queue 22 (FIFO principle). The event is looked up in a prefetch target buffer in step 102 (corresponding to ② in FIG. 1). Step 103 then determines if a match is found in the prefetch target buffer 20. If a match is found, step 104 issues a prefetch for the associated address through the I/O interface unit 24 (corresponding to ③ in FIG. 1).

For every cache miss in cache 26, the method proceeds to step 105 (corresponding to ④ in FIG. 1). That is, upon a miss in the cache 26, an address of the data is presented to both the I/O interface unit 24 and the prefetch target buffer 20. This address is associated with an event which happened N cycles previously, and is inserted into the prefetch target buffer 20 indexed by the event.

Timing is performed with the time queue 22. The time queue 22 has a length j, j being an integer greater than or equal to one. The time queue holds tags associated with the j most recent time-ordered events. For example, the completion of an instruction at the end of a pipeline may be the event and the address of that instruction would be the tag stored in the time queue. Therefore, the time queue 22 would contain the addresses of the last j instructions retired. The time queue 22 along with the prefetch target buffer 20 generates prefetches an adjustable amount of time, a predetermined amount of time or a programmable amount of time before load instructions by changing the length j of the time queue 22. If the time to execute j instructions is greater than or equal to N cycles, N being the memory access time, the latency of the prefetch will be hidden and the processor will see a cache hit (if the address was predicted correctly) when the associated load is executed. A programmable amount can be used because different values of N work better than others in different applications and N can be programmed while a processor is running. That is, the value of N is changed when running a program different from that which was running. N can be fixed by the length of time queue in the hardware.

Target addresses are stored in the prefetch target buffer 20 when a triggering event is detected. That is, a target address is stored in the prefetch target buffer 20 on a cache miss. For example, the first time a load instruction located at an address a, and which fetched data at an address X, misses in the cache, an entry with the value X is written into the prefetch target buffer 20 indexed by b, where b is the value at the tail of the time queue 22 and thus is the address of the jth instruction before the load. Therefore, the effective address X is associated with the instruction which executed j instructions before the load at a was executed. The next time the instruction at address b is encountered there will be a hit in the prefetch target buffer 20 and a prefetch for the address X will be issued. If the instruction at address a again follows the instruction at address b after j intervening instructions, the data at the address X will be in the cache by the time it is executed and the load will not stall because of a cache miss.

The operation of the time queue 22 will be explained with reference to FIGS. 3A and 3B. A four instruction sequence is shown in FIG. 3A. The instruction at address 103 will perform a fetch from address X. The time queue 22 in FIG. 3B has a length 3 and contains the addresses of the three instructions that were completed before the load. That is, they were executed ahead of the instruction at address 103, i.e., instructions at addresses 100–102. When the load at address 103 misses in the cache 26, the address 103 is cached (written) at the head of the time queue 22 and the target address X is cached (written) into the prefetch target buffer 20 indexed by the address 100 (the event) at the tail of the time queue 22. The next time this four instruction sequence is executed, a prefetch will be started for the address X as soon as the instruction at the address 100 is fetched. The prefetch has at least three instruction execution times to complete before the load at address 103 executes, that is, before the value at the address X needs to be in the cache 26 for the load at address 103.

The depth of the time queue is used to approximate the time taken to execute a sequence of events. The predictability of the execution time determines the quality of the approximation. For example, if time is measured by the number of instructions executed, the effective delay afforded by the time queue length will change as the average number of cycles per instruction varies across the program. This uncertainty may lessen the effectiveness of a prefetch since it may be executed too early or not early enough.

The length of the time queue 22 determines the amount of time available for a prefetch. The time required for a prefetch in turn depends upon the design of the memory system, the speed of the memory, or the number of levels in the cache hierarchy. A single queue length will not be optimal for all configurations. The time queue design can be extended by making the queue length programmable so that system software can configure the queue at boot time depending on the memory system in use. If different processes have sufficiently differing reference patterns that affect the efficiency of the time queue 22, the queue length can be part of the process state and switched for each process.

Event-tags are used to index the prefetch target buffer 20. The event tags need not be instruction addresses. In the above example shown in FIGS. 3A and 3B, a processor prefetches the target of a load instruction when the jth previous load is executed rather than the jth previous instruction. Load instructions were used as examples in the above discussion, but the prefetch target buffer 20 and time queue 22 can also be used in an instruction stream to prefetch into an instruction cache rather than or as well as a data cache. A triggering event could be branch instructions instead of load instructions. The effect would be to increase the hit rate in the instruction cache.

The prefetch target buffer 20 of the present invention predicts a target of load instructions based on past use. A load instruction used once is likely to reference the same datum or the same cache block the next time it is executed. This, however, is not always accurate. For example, a load inside a loop that iterates over the elements of a vector will not reference the same data in different iterations. Rather, the load inside the loop will reference data that is separated by some stride. That is, code that passes through a vector will not reference the same data on subsequent references, but will reference data that is separated by some stride. By adding additional state it is possible to add stride prediction to the prefetch target buffer 20.

The prefetch target buffer 20 and the time queue 22 are not restricted to a first level cache or to data fetches. A prediction table can be used at a second level cache. The address of each miss from a first level cache would be checked in the prefetch target buffer 20 while a first level miss would be satisfied from the second level cache. If there is a hit in the prefetch target buffer 20 the second level cache would attempt to prefetch the target into the first level cache. The time queue 22 would queue addresses of misses in the first level cache.

In addition, associating one memory event with a future event can be applied at the file system level. Whenever a file system block is fetched from the disk into a buffer pool in memory the operating system could prefetch another disk block. A software implementation of a prefetch target buffer 20 and time queue 22 could reduce system overhead. A large data base might exploit the same mechanism using a data structure rather than a disk block as the prefetch unit.

The prefetch target buffer 20 of the present invention is implemented as a narrow cache. The width need only be the size of the virtual address of a cache block plus some state.

The design space for the prefetch is less restricted than that of other caches. The technological limitations that restrict cache size and associativity do not necessarily apply to prefetch target buffers since access time is not critical. That is, if the access time of the prefetch target buffer 20 requires an additional cycle, the length of the time queue 22 may be increased by one to compensate for the additional cycle. Thus, the prefetch target buffer 20 need not be implemented close to a central pipeline of a processor, as in the prior art. Rather, the prefetch target buffer 20 can be moved off the chip and need not be close to the chip.

A longer time queue increases the prediction distance. However, there are several tradeoffs. If a prefetch is completed too soon it may replace needed data (pollution) and/or subsequent I/O activity may move the prefetched data out of the data cache. A prefetch that is not predicted correctly will reference data that is not needed by a program. If this data is loaded into the cache 26 it may displace a frequently needed reference. This results in an increase in the miss rate. This occurrence can be minimized by adding a victim cache or a pollution control cache (not shown). A pollution control cache functions by placing prefetched data into a small auxiliary cache rather than into a main cache. If a subsequent reference misses in the data cache (main cache) but hits in the pollution control cache (auxiliary cache), the data is supplied by the auxiliary cache and is then stored in the main cache. A victim cache captures cache entries that are ejected by another reference. In either case data lost to pollution can be recovered. This minimizes the impact of poor prediction on miss rates.

Further, as the prediction distance increases, the number of different paths that lead to a load increases so more than one entry in the prefetch target buffer 20 can point to the target of a load instruction. This aliasing reduces the effective size of the prefetch target buffer 20 as shown in FIGS. 4A and 4B. In FIG. 4A the load instruction at location 103 is reached either by the path of instructions at 100–101–102–103 or the path of instructions at 200–201–102–103. If the look-ahead depth of the time queue 22 is 3 the load will be predicted by both 100 and 200 causing the load target X to be in two locations in the prefetch target buffer 20 as shown in FIG. 4B.

The area consumed by the prefetch target buffer 20 is comparable to that of conventional branch target buffers or branch history tables. Because the access time of the prefetch target buffer 20 is not as time critical as either the branch target buffer or branch history table it may be implemented with more space efficient memory cells than the branch target buffers or branch history tables. Since a prefetch should be canceled if the target is already present in the cache 26, a second set of cache tags may be required. This allows the prefetch target buffer 20 to look up prefetch addresses while the cache 26 is used elsewhere for data or instruction accesses. If the bandwidth of the cache tags is sufficient, the tags may be time-multiplexed without impacting performance, mitigating any extra area requirements.

The prefetch target buffer 20 of the present invention can increase the amount of bandwidth required to memory since incorrect prefetches and discarded (correct) prefetches generate non-productive I/O traffic as do other prefetch mechanisms. Because the prefetch target buffer increases the I/O traffic, a non-blocking I/O interface and a queue of a pending read should be implemented. Implementing a prefetch may cause a pending prefetch to block other I/O accesses causing the processor to stall. The effect of the resulting stall depends on the implementation of the processor, the memory system and the program behavior.

However, because prefetching is concurrent with instruction execution, it need not increase the critical path of the pipeline. It is the I/O interface unit 24 that provides additional complexity to the system. The prefetch target buffer 20 of the present invention provides an address that must be queued for reads. Since a prefetch into a cache 26 looks the same as a fetch into a cache, implementing a prefetch target buffer 20 does not impact the primary cache.

The above-mentioned features of the present invention provide the following advantages. The prefetch target buffer 20 and time queue 22 of the present invention provide a simple system which is focused, flexible and inexpensive. Good prediction and long look-ahead are achieved without having to look-ahead of the processor in the instruction stream. Only cache blocks that have incurred misses in the past are prefetched. The present invention can be used to perform prefetching of both instructions and data at all levels of the memory hierarchy. The look-ahead can be changed to match or exceed the memory latency simply by choosing an appropriate size of the time queue 22. Even the type of events input to the time queue 22 can be changed. Because the time queue 22 is on the order of tens of entries long the size of each entry in the prefetch target buffer 20 is small (a single word or a double word). The relatively small number of prefetch target buffer 20 entries (1K to 4K) reduces the miss rate of an associated cache to less than that of a cache twice its size. Further, the present invention works independently of the associated hardware and does not lie on a critical path.

As the speed of processors increases along with the relative cost of memory access, it becomes increasingly important in processor design to find a way to hide the memory latency in the processor-memory interface. Prefetching data into a cache is an effective means of hiding this latency. For prefetching to be effective, a prefetch must be both accurate and timely. The prefetch target buffer 20 of the present invention predicts future fetches based on past events, and the time queue 22 is a mechanism that assures that the prefetches will be initiated early enough to be effective. Because the invention focuses on non-time-critical prefetching, it does not suffer from severe implementation penalties. Further, it can be applied at many levels of a memory hierarchy because it addresses the problem of address prediction so directly.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

We claim:

1. A history-based prefetch method, said method comprising the steps of:

a) selecting an event from a time queue to correlate with a miss of an address of a cache block;

b) storing the address of the cache block miss in a cache indexed by the event;

c) performing a lookup in the cache for every event in a predetermined class of events; and d) issuing a prefetch for the address of the cache block if a match is found.

2. A method according to claim 1, wherein in said step d) the prefetch occurs to a prefetch target buffer.

3. A method according to claim 1, wherein in said step a) the event is an instruction address.

4. A method according to claim 1, wherein in said step a) the event is a data address.

5. A history-based prefetch method, said method comprising the steps of:
   a) entering an event into a time queue;
   b) looking up an address of the event in a prefetch target buffer;
   c) determining if the address of the event is found in the prefetch target buffer;
   d) issuing a prefetch for an address indexed by the event if a match is found; and
   e) correlating an address of a cache miss with an event in the time queue and inserting the cache miss address into the prefetch target buffer indexed and tagged by the event.

6. A method according to claim 5, further comprising, after said step d), a step of performing a cache lookup if a match is found in said step d).

7. A history-based prefetch method, said method comprising the steps of:
   a) inserting, when a cache miss occurs, a missing address of a cache block into an associative buffer having a tag and address field;
   b) indexing the associative buffer by an address of an instruction that was fetched N cycles ago, N being a delay time and being greater than or equal to a memory access time;
   c) using the address of the instruction to perform a lookup into the associative buffer;
   d) determining if a tag of the instruction is found in the associative buffer; and
   e) performing a cache prefetch operation using the address indexed by the tag if found in the associative buffer.

8. A method according to claim 7, further comprising the step of looking up in the cache the address indexed by the tag found in the associative buffer.

9. A method according to claim 8, wherein the delay time N is any amount greater than or equal to a memory access time.

10. A method according to claim 8, wherein the delay time N is a predetermined amount greater than or equal to a memory access time.

11. A method according to claim 8, wherein the delay time N is a programmable amount greater than or equal to a memory access time.

12. A method according to claim 7, wherein in said step a) the associative buffer is a prefetch target buffer.

13. A method according to claim 12, wherein in said step a) the addresses stored in the prefetch target buffer are addresses in data space.

14. A method according to claim 13, wherein the addresses in the data space trigger prefetches to a data cache.

15. A method according to claim 12, wherein in said step a), the addresses stored in the prefetch target buffer are addresses in instruction space.

16. A method according to claim 15, wherein the addresses stored in the instruction space trigger prefetches to an instruction cache.

17. A method according to claim 12, wherein said step e) comprises the substep of prefetching the address of the instruction in the prefetch target buffer and placing it in the cache to prevent future misses.

18. A history-based prefetch system, comprising:
   a time queue for receiving events and outputting delayed events;
   a prefetch target buffer, coupled to the time queue, for receiving the events and the delayed events from the time queue;
   an interface unit, coupled to the prefetch target buffer, for receiving the output from the prefetch target buffer; and
   a cache for receiving an output from the interface unit and outputting an address to the prefetch target buffer and the interface unit.

19. A system according to claim 18, wherein the time queue delays events N cycles, N being a predetermined amount greater than zero.

20. A system according to claim 18, wherein the time queue delays events N cycles, N being programmable.

21. A system according to claim 18, wherein the time queue delays events N cycles, N being any amount greater than zero.

* * * * *